US006947908B1

(12) United States Patent
Slater

(10) Patent No.: US 6,947,908 B1
(45) Date of Patent: Sep. 20, 2005

(54) SYSTEM AND USE FOR CORRESPONDENT BANKING

(75) Inventor: Alan Slater, East Brunswick, NJ (US)

(73) Assignee: Citibank, N.A., New York, NY (US)

( * ) Notice: Subject to any disclaimer, the term of this patent is extended or adjusted under 35 U.S.C. 154(b) by 624 days.

(21) Appl. No.: 09/384,278

(22) Filed: Aug. 27, 1999

Related U.S. Application Data

(63) Continuation of application No. 09/237,739, filed on Jan. 26, 1999.
(60) Provisional application No. 60/138,607, filed on Jun. 11, 1999, and provisional application No. 60/098,196, filed on Aug. 27, 1998.

(51) Int. Cl.[7] .............................................. G06F 17/60
(52) U.S. Cl. ........................................... 705/51; 705/50
(58) Field of Search .............................. 705/44, 39, 35, 705/50, 51; 235/379, 380

(56) References Cited

U.S. PATENT DOCUMENTS

| | | | |
|---|---|---|---|
| 4,891,503 A | 1/1990 | Jewell | 235/380 |
| 5,453,601 A | 9/1995 | Rosen | 235/379 |
| 5,455,407 A | 10/1995 | Rosen | 235/380 |
| 5,475,758 A | 12/1995 | Kikuchi | 380/25 |
| 5,511,121 A | 4/1996 | Yacobi | 380/24 |
| 5,557,518 A | 9/1996 | Rosen | 364/408 |
| 5,590,197 A | 12/1996 | Chen et al. | 380/24 |
| 5,602,918 A | 2/1997 | Chen et al. | 380/21 |
| 5,677,955 A | 10/1997 | Doggett et al. | 380/24 |
| 5,692,132 A | 11/1997 | Hogan | 395/227 |
| 5,727,249 A | 3/1998 | Pollin | 705/40 |
| 5,757,917 A | 5/1998 | Rose et al. | 380/25 |
| 5,781,632 A | 7/1998 | Odom | 380/24 |
| 5,790,677 A | 8/1998 | Fox et al. | 380/24 |
| 5,799,087 A | 8/1998 | Rosen | 380/24 |
| 5,809,144 A | 9/1998 | Sirbu et al. | 380/25 |
| 5,822,737 A | 10/1998 | Ogram | 705/26 |
| 5,825,881 A | 10/1998 | Colvin, Sr. | 380/24 |
| 5,848,400 A | 12/1998 | Chang | 705/35 |
| 5,883,810 A * | 3/1999 | Franklin et al. | 700/232 |
| 5,931,917 A | 8/1999 | Ngyuen et al. | 709/250 |
| 5,933,816 A | 8/1999 | Zeanah et al. | 705/35 |
| 5,953,422 A | 9/1999 | Angelo et al. | 380/23 |
| 5,974,146 A | 10/1999 | Randle et al. | 380/24 |
| 5,999,624 A | 12/1999 | Hopkins | 380/24 |
| 6,003,014 A | 12/1999 | Lee et al. | 705/13 |

FOREIGN PATENT DOCUMENTS

JP 02001331646 A * 11/2001

OTHER PUBLICATIONS

IBM Technical Disclosure Bulletin; Financial systems Interface; Oct. 1, 1988; vol. 31.*
Notification of Transmittal of the International Search Report or the Declaration for PCT/US99/19627 and the corresponding International Search Report dated Oct. 14, 1999.
Tau Zhou, "E–Commerce, Digital Signature Technology," *Windows NT Magazine*, Feb. 1999.
Gary King, "Secure Online Credit Card Transactions," *Windows NT Magazine*, Feb. 1999.

* cited by examiner

*Primary Examiner*—Pierre Elisca
(74) *Attorney, Agent, or Firm*—George T. Marcou; Kilpatrick Stockton LLP

(57) ABSTRACT

The present invention comprises a system and method for a customer and merchant to perform an on-line, and in some cases, real-time financial transaction from a personal computer or similar processing terminal over a public access communications network utilizing a universally acceptable electronic financial transaction instruction that debits a customer's selected account and notifies a merchant that a credit is due or forthcoming and a service provider. The financial transaction instruction is provided in a secured format for transactions sent over the public access communications network, which is external from any other conventional open or closed communication channels used for performing financial transactions.

41 Claims, 16 Drawing Sheets

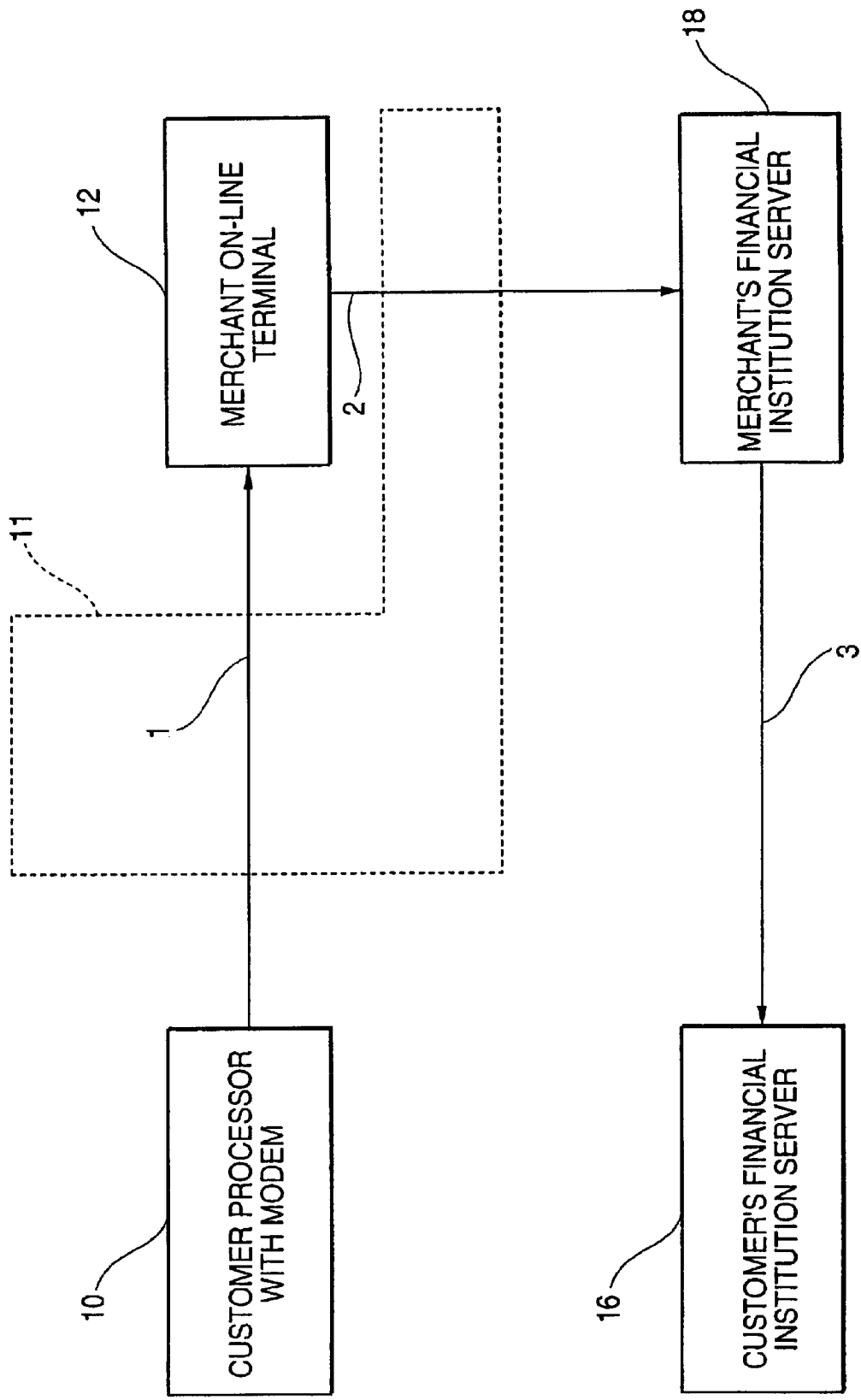

SYSTEM AND USE FOR CORRESPONDENT BANKING

CROSS-REFERENCE TO RELATED APPLICATIONS

Reference and priority to provisional application No. 60/098,196, filed Aug. 27, 1998 titled, "System for Merchant Function Assumption of Internet Checking and/or Savings Account Transactions" and a continuation of application Ser. No. 09/237,739 filed Jan. 6, 1999 titled, "POS at Home—System and Method for Accessing Banking Account Funds for Internet Transaction" are hereby claimed and the entirety of the subject matter of each pending application is incorporated by reference. Further, reference is made to and application Ser. No. 09/384,678, filed Aug. 27, 1999 title, "System for Merchant Function Assumption of Internet Checking and/or Savings Account Transactions," the entirety of which is hereby incorporated by reference. Finally, the subject matter of provisional application No. 60/138,607 filed Jun. 11, 1999 titled, "Certificate-Based Credit Account" is hereby incorporated by reference.

FIELD OF THE INVENTION

The present invention relates to banking systems and Internet transactions, and more particularly, to a system that allows a customers, merchants, and their respective financial institutions to perform Internet transactions.

BACKGROUND

With the increasing commercialization of the Internet, methods of performing payment transactions are becoming well known and new payment methods are desired. In an effort to expand the available sources of payment, methods have been developed to utilize checking account funds to perform Internet transactions.

A first conventional method uses "electronic checks" to perform transactions. One example of such an electronic check is the "e-check" process an established by the Financial Services Technology Consortium (FSTC). Prior art FIG. 1a illustrates the system and flow of information used in performing an e-check Internet transaction. In order to participate in an e-check Internet transaction, all of the participants possess the enabling software. Utilizing a processor with a modem 10, the customer sends customer payment instructions 1 over the Internet 11 to a merchant's Internet terminal 12. The merchant's terminal 12 attaches the merchant's payment instructions and forms a data message having both the customer's and the merchant's payment instructions 2. The data message 2 is transmitted over the Internet to the merchant's financial institution server 18 where the server reads the data message and begins settlement procedures with the customer's financial institution 16 over the automated clearing house (ACH) network or electronic check processing, (ECP) network using ACH or ECP formatted instructions 3. Since the merchant's financial institution is initiating the ACH or ECP process, the ACH or ECP instructions 3 are in the form of an ACH or ECP debit request.

There are a number of problems, however, associated with current electronic check methods. For example, there is a delay between the time that the merchant is notified that the e-check has been returned. This delay may be three or more days. As a result, the merchant typically must wait a number of days to find out whether or not the funds are good, thereby delaying fulfillment of the order. As such, utilizing this type of electronic check creates uncertainty for the merchant, as they are unsure if the electronic check will be paid. Thus, despite the transaction having the appearance to the customer of being on-line and real-time, it takes several days for the merchant's account to be charged and for the transaction to be completely processed.

Even taking into account the delays associated with the e-check payment process, it is still an extremely useful and viable payment method for many types of goods and/or services but, for a consumer to be able to use this type of e-check, the consumer must be a member of a financial institution or financial institution that offers this service. Over the next 5 to 10 years, however, only a few dozen financial institutions are estimated to participate in issuing electronic checks. Because of this limited participation, the majority of customers will not have access to e-checks from the financial institution with whom they have an account relationship. Thus, in turn, the number of customers that a merchant can attract and serve with an electronic check is limited.

Additionally, for example, not only must the customer be a member of a participating financial institution, but the merchant must set up procedures for these types of transactions to deal with the limited number of participating financial institutions. Due to the limited number of customers who would utilize this payment method, a merchant may be discouraged from expending the time and money to establish such a system.

A second conventional payment system and method as shown in FIG. 1b begins with the customer modem 10 sending customer payment instructions 1 over the Internet 11 to a merchant's Internet terminal 12. The merchant's terminal 12 10 attaches the merchant's payment instructions and forms a data message having both the customer's and the merchant's payment instructions 2. The data message 2 is transmitted over the Internet to the customer's financial institution server 16 where the server reads the data message and begins settlement procedures with the merchant's financial institution 18 over the automated clearing house (ACH) network using ACH formatted instructions 3. Since the customer's financial institution is initiating the ACH or ECP process, the ACH instructions 3 are in the form of an ACH credit. An ACH credit is guaranteed since it is issued by the authorizing financial institution. While this method solves the problem of on-line notification to the merchant that the customer has the funds, the method still requires that at least the customer, merchant and the customer's financial institution be equipped to handle Internet formatted transactions and instructions. This is extremely costly due the stringent hardware and software requirements.

In a third conventional payment system, the customer, likely for security reasons, does not choose to have the customer payment instructions go through the merchant. In FIG. 1c, the customer modem 10 directs the customer payment instructions to the customer financial institution 16 via the Internet 11. At this point, the customer's financial institution may hide or encrypt the customer's financial information such that it is recognizable only to them or the customer's financial institution removes the customer's information altogether. Along with authorization, the customer's financial institution sends a data message 5 to the merchant terminal via the Internet. After receipt of the data message 5 the merchant may currently process the payment as shown in FIG. 1a or 1b. As discussed with reference to the conventional payment methods described above, this payment flow requires that at least the customer, the merchant, and the customer's financial institution be equipped to receive and process Internet formatted transaction requests.

Currently, there is a need for low-cost access to various individual and business accounts held by customers and merchants at multiple financial institutions, to perform financial transactions over the Internet. Most customers access the Internet from remote locations, such as personal computers at home or at a business. Further, many financial institutions, though accessible through networks such as automated teller machine (ATM), ACH, ECP, are not accessible on-line and in real-time by Internet customers and/or merchants wishing to utilize their accounts held within the financial institutions. Finally, the time and expense necessary to put an on-line, realtime payment system into place is currently too great for the majority of financial institutions.

SUMMARY OF THE INVENTION

Generally, the present invention comprises a system and method for a customer and merchant to perform an on-line, and in some cases, real-time financial transaction from a personal computer or similar processing terminal over a public access communications network utilizing a universally acceptable electronic financial transaction instruction that debits a customer's selected account and notifies a merchant that a credit is due or forthcoming. The financial transaction instruction is provided in a secured format for transactions sent over the public access communications network, which is external from any other conventional open or closed communication channels used for performing financial transactions.

The system and method of the present invention advantageously does not require that there be a traditional financial institution relationship between the customer, the merchant, and their respective service providers/ correspondent financial institutions facilitating the on-line financial transactions. Further, the system beneficially does not require the financial institution used by the customer and/or the financial institution used by the merchant to have the capability to perform financial transaction instructions over the Internet. Additionally, the system is compatible with current financial transaction systems, thus making the present financial transaction instruction a universally acceptable on-line financial payment scenario.

According to a preferred embodiment, a method of performing a financial transaction between a customer and a merchant, comprises creating customer payment instructions comprising encrypted, electronic representations of a customer transaction amount, account information, financial institution information and security information . The account information identifies various payment accounts, e.g., checking, savings, money market, at the customer's financial institution and the security information may comprise a personal identification number associated with the identified account information for authorizing its use in an on-line payment transaction. The customer payment instructions are protected by a first secure mechanism, such as an attached digital certificate including a digital signature. The digital signature or other authentication device of the customer provides verification of the identity of the customer and the integrity of the customer payment instruction. The customer payment instructions are electronically delivered to the merchant or in some cases, the customer's financial institution, over a public access network like the Internet.

Merchant payment instructions are appended to the customer payment instructions to create financial transaction instructions. The merchant payment instructions comprise merchant identification and merchant deposit account identification used in performing the transaction. The financial transaction instructions may be protected by a second secure mechanism, such as with encryption and/or by the digital signature of the merchant. The merchant's digital signature provides verification of the merchant's identity and of the integrity of the financial transaction instructions. A digital certificate of the merchant may be appended to the financial transaction instructions, where the merchant's digital certificate provides additional verification of the merchant's identity and the integrity of the financial transaction instructions.

The financial transaction instructions are electronically delivered, such as over the Internet, to at least one service provider offering access to the Internet and other on-line communication channels and public access networks to perform the financial transaction. The service provider removes and reformats the encrypted financial transaction instructions received via the Internet or comparable network and forms a recognizable transaction request or message for the participating financial institutions. Reformatting the request or message comprises placing the Internet financial transaction request into a format that is recognizable and acceptable to the participating financial institutions. These are formats which are deliverable over conventional networks or channels. The reformatted transaction requests or messages are electronically delivered to the participating financial institutions through the appropriate network or channel.

A non-exhaustive list of advantages provided by the foregoing system and method includes: reduction in the amount of equipment and hardware necessary for the facilitation of the payment transaction; increase in the efficiency of Internet payment methods; increase in the number of parties who may partake of Internet purchasing schemes; and reduction in cost associated with Internet payment schemes without compromising security.

BRIEF DESCRIPTION OF THE DRAWINGS

In the drawings:

FIG. 1a is a first conventional payment system;

DESCRIPTION OF THE PREFERRED EMBODIMENTS

Figure 1B:
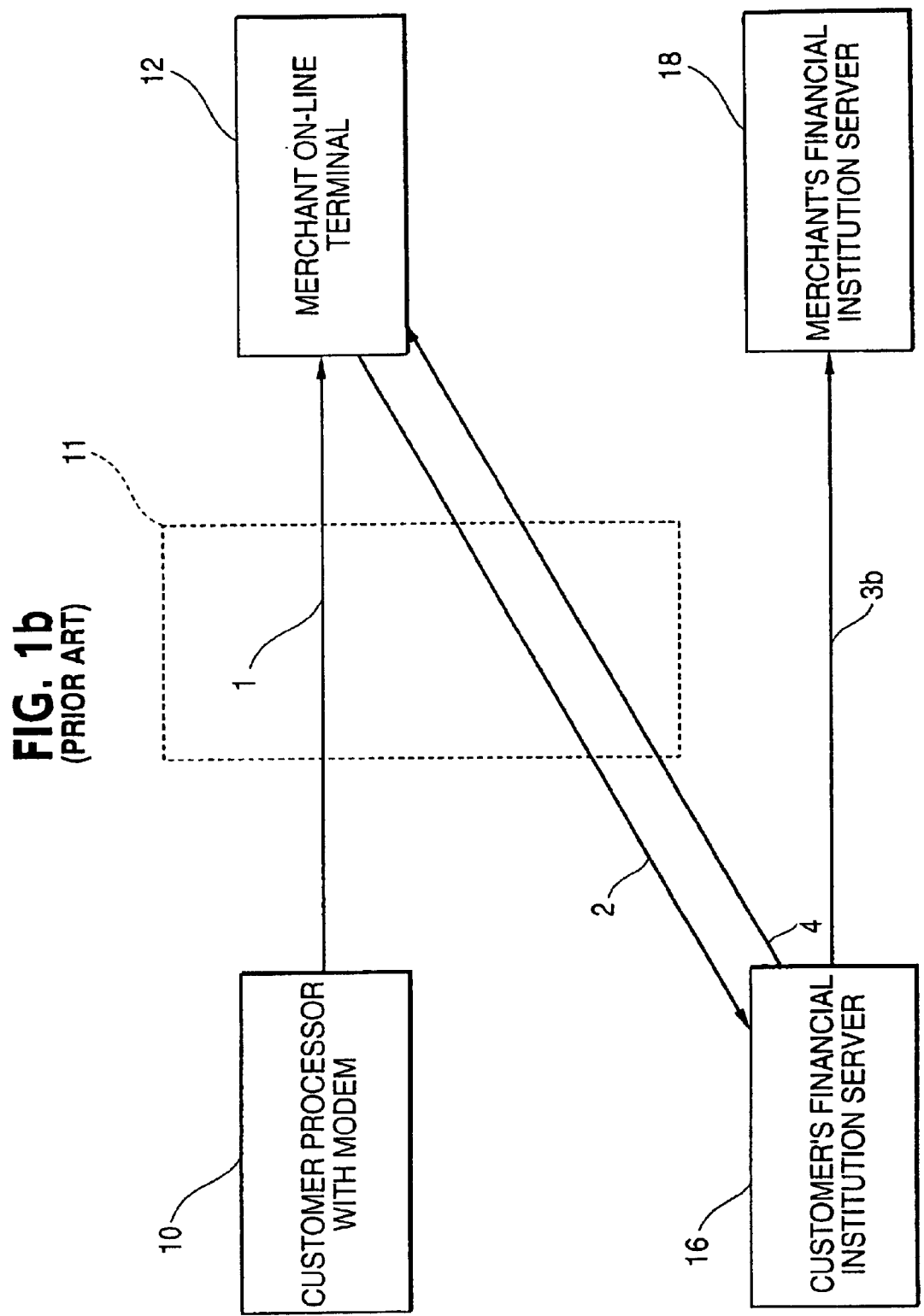
FIG. 1b is a second conventional payment system.
Figure 1C:
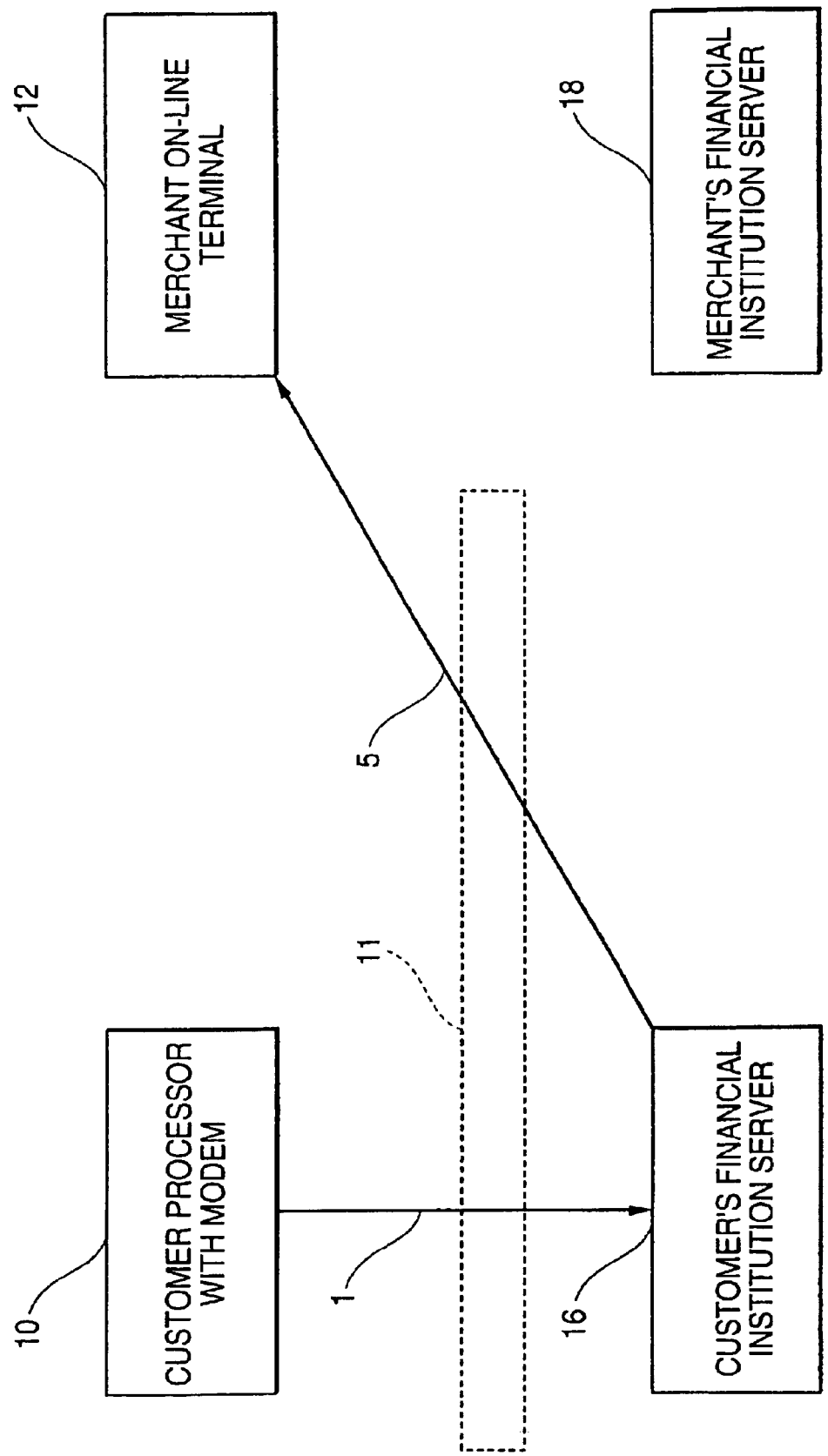
FIG. 1c is a second conventional payment system.

The following preferred embodiments of the present invention require that at least the merchant and the customer be equipped with Internet payment instruction software including but not limited to encryption programs as well as digital certificates for identification and digital signature capability for confirming message integrity. Further, in a number of the preferred embodiments, one skilled in the art will recognize that all parties to the transaction must be equipped with some type of enabling software. Prior to discussing the particular payment flow system and method embodiments, the following provides an explanation of the possible sources of the software and certificates and the subject matter included therein.

In the specific embodiments that follow, the customers and the merchants are furnished with digital certificates and software enabling them to transact over the Internet. These enabling components may be supplied by customer's and merchant's respective financial institutions or the service providers acting in lieu of the customer and merchant financial institutions. In the latter case, the necessary customer and customer's financial institution information is supplied by the customer's financial institution for facilitating a payment out of the funds in the customer's account(s) with the customer's financial institution and similarly, the merchant and merchant's financial institution information is supplied by the merchant's financial institution for facilitating a credit to the merchant's account.

The customer information includes at least payment account information and other identifying information that may include name, address, social security number, and e-mail address/URL. The customer's financial institution information includes at least financial institution name and routing transit number. Either the customer's financial institution or the customer's financial institution service provider (CFISP) or even an independent third party service provider then acts as a certificate authority and utilizes the customer and customer's financial institution information to compose digital certificates that are distributed to the customers of the customer's financial institution.

Similarly, the merchant's financial institution, MFISP, or third-party service provider, collects all of the requisite merchant and merchant financial institution information so as to issue digital certificates containing the requisite merchant and merchant financial institution information. All of the issued digital certificates may follow the X.509 standards for such certificates, recommended by the International Telecommunications Union. Digital certificates are generally known in the electronic communication industry as offering a measure of security to electronic transactions. As applied to a preferred embodiment of the present invention, the digital certificates issued by the service provider, will automatically attach to the payment order sent via the Internet by the customer and merchant upon the institution of the payment software for making an Internet purchase.

In addition to the digital certificates, at least one of customer's financial institution, merchant's financial institution, CFISP, or MFISP must issue enabling payment software to participating customers and merchants. A preferred payment software package of the present invention includes programs/applications for retrieving necessary payment execution information and for creating data messages (e.g., e-mails, Hypertext Markup Language (HTML) pages) under a specially defined file type, a browser plug-in for use with known web browsers (e.g., Netscape® and Internet Explorer®) for recognizing and executing the newly defined files, a program for encrypting data messages, and optionally, the issued digital certificates.

Embodiments of the present invention anticipate that both the customer and the merchant will be creating data messages with the issued payment software. The data message program retrieves and compiles purchase order information from the customer's files, as necessary, for controlling payment transactions. The purchase order information includes payment instructions, an assigned serial number, the customer's e-mail address and/or URL, the customer's digital signature, the customer's digital certificate (including the customer's account number(s) or other security methodology and the customer's financial institution routing/transit number), and if applicable, the CFISP's data message address (e.g., e-mail address or URL). Additionally, the merchant's payment software program/application adds information to the customer's e-mail upon receipt, to facilitate the payment transaction. This additional information includes a reference number, the merchant's data message address, the merchant's digital signature, the merchant's digital certificate (including merchant's account and financial institution information), and if applicable, the MFISP's data message address.

One skilled in the art will recognize that the following preferred embodiments necessarily incorporate compatible, interactive enabling software in order to facilitate at least the Internet transactions between the participating parties.

Figure 2:
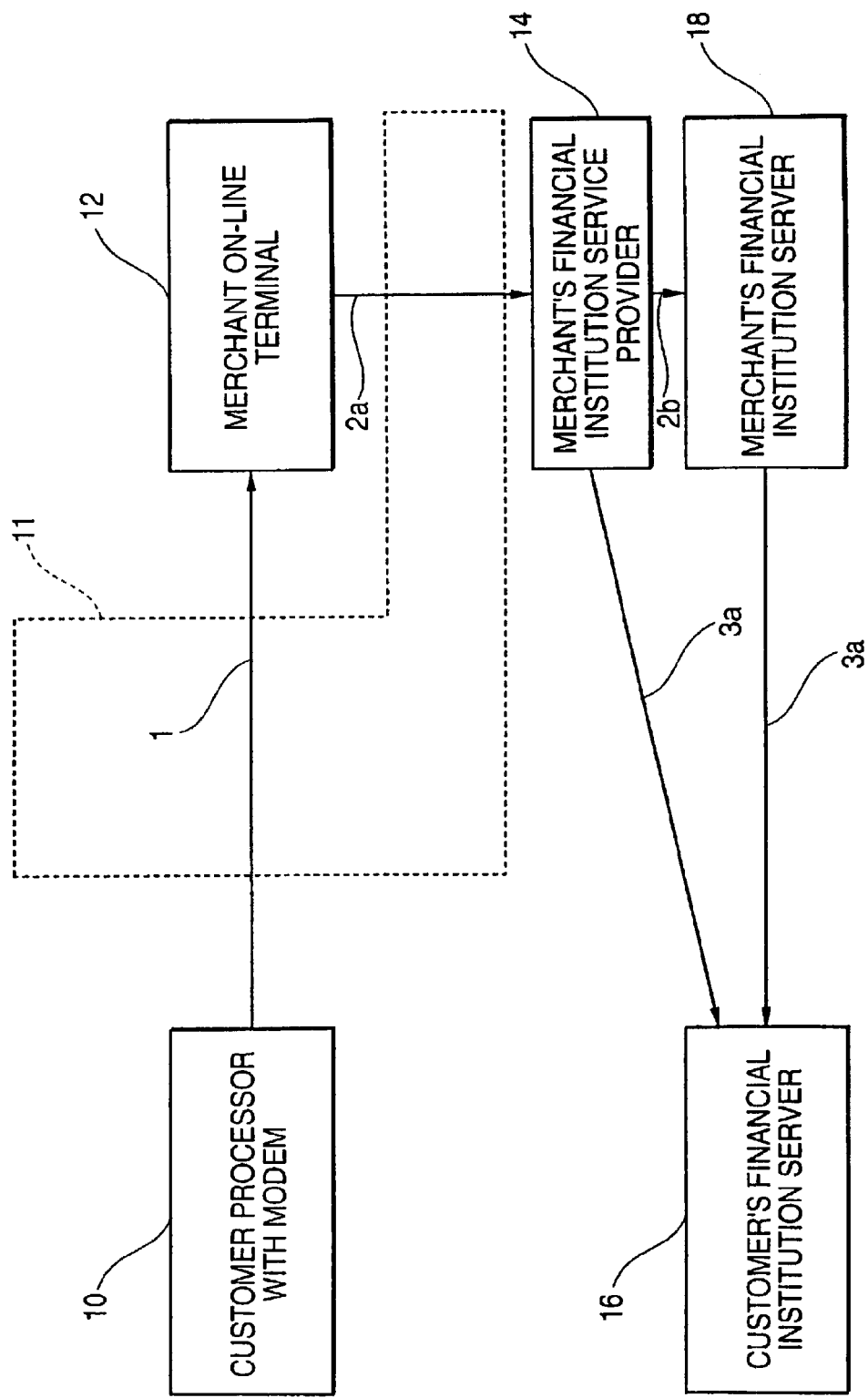
FIG. 2 is a first payment system embodiment.

According to a first preferred embodiment of the present invention, FIG. 2 provides a system and method enabling a merchant's financial institution server 18 via a merchant's financial institution service provider (MFISP)/correspondent financial institution server (hereafter "MFISP") 14 to allow a merchant terminal 12 to perform public access network (e.g., Internet) (hereafter "Internet") transactions. In the first preferred embodiment, the merchant's financial institution is not equipped to handle Internet payment transactions without employing a MFISP. The payment transaction flow of FIG. 2, enables a merchant's financial institution to offer Internet payment services to its merchant customers.

The Internet transaction is performed with an electronic payment vehicle that allows purchases, exchanges of value, and other payment information or order instructions to be sent over the Internet. In practice, a first embodiment of this invention enables a customer modem 10 to transmit customer payment instructions 1 via the Internet 11 to a merchant terminal 12. The merchant terminal 12 adds the merchants payment instructions and transmits the data message containing both the customer and merchant payment instructions 2a (hereafter "data message") over the Internet 11 to the MFISP server 14. The MFISP 14 receives the data message 2a and reformats it into a deposit/credit message 2b that is recognizable and readable by the merchant's financial institution 18. This reformatting is necessary since the original data message 2a received by the MFISP is in an Internet or other public access network format, unreadable by the merchant's financial institution 18. The MFISP transmits the deposit message over a closed communication channel (CCC) or similar network which is established as a network for carrying deposit messages to financial institutions. The MFISP may elect to aggregate one or more payment instructions and send them to the merchant's financial institution according to specific time intervals and/or maximum number of aggregated deposit messages. In an alternative sub-part of the first preferred embodiment, the CCC could be the Internet but the MFISP 14b is still needed to format the deposit message into a readable Internet format 2b wherein the originating Internet format 2a would be unrecognizable to the merchant's financial institution 18 without the re-formatting.

The merchant's financial institution 18 receives and processes the deposit message 2b and initiates settlement with the customer's financial institution server 16 over the traditional ACH or ECP network or similar settlement channel with an ACH or electronic check processing (ECP) debit request 3a. Alternatively, the MFISP is capable of initiating the ACH or ECP debit request 3a as opposed to the merchant's financial institution.

A second preferred embodiment of the present invention anticipates the situation where the customer's financial institution does not choose to have the customer's account number, or other sensitive information necessary for carrying out the payment transaction, presented to the merchant in any readable form. But, in the second preferred embodiment, the customer's financial institution does not have the necessary decryption tools for reading the encrypted, sensitive information.

Figure 3:
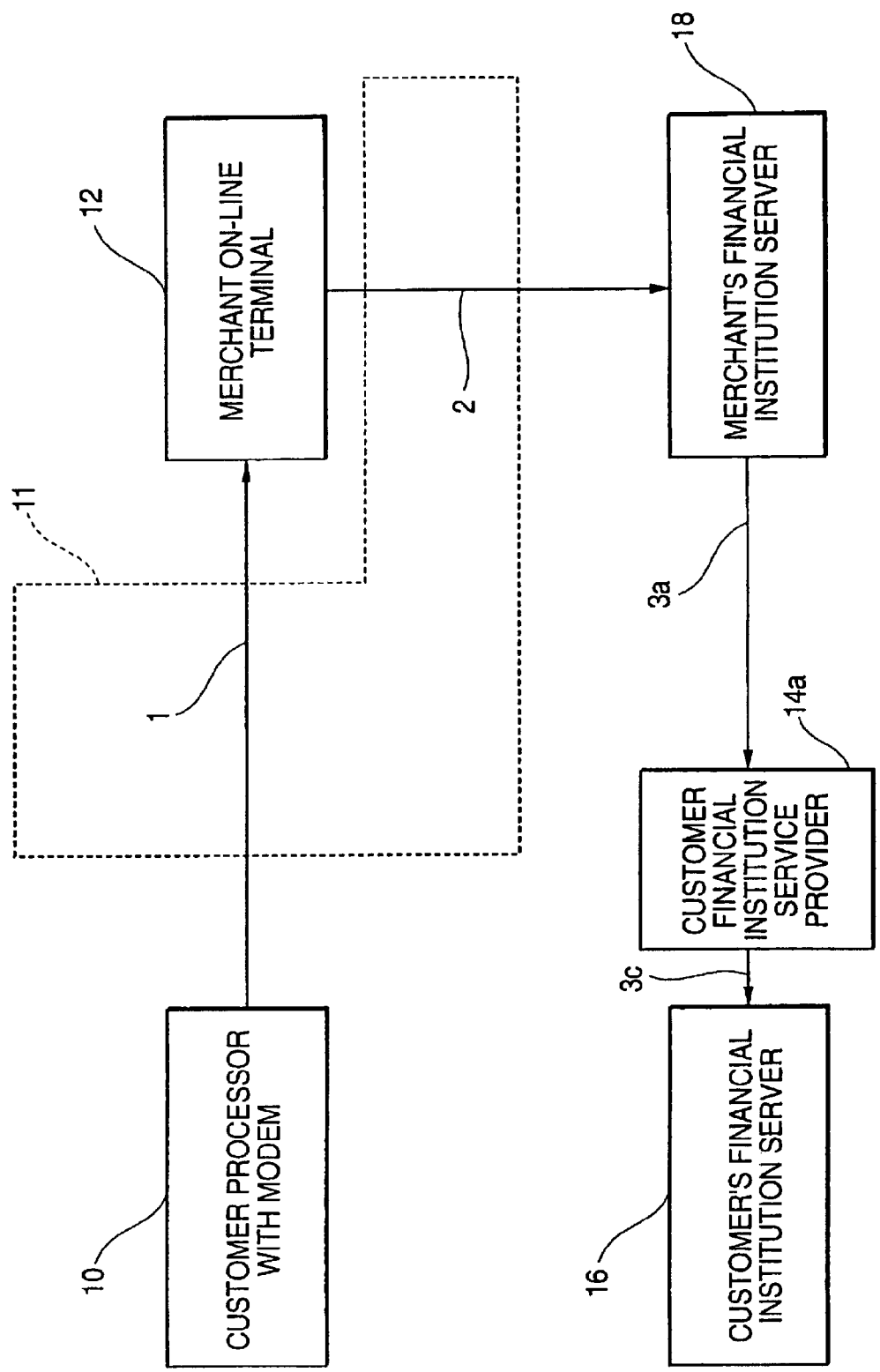
FIG. 3 is a second payment system embodiment.

In FIG. 3, utilizing a processor with a modem 10, the customer sends encrypted customer payment instructions 1 over the Internet 11 to a merchant's Internet terminal 12. The merchant's terminal 12 attaches the merchant's payment instructions and forms a data message having both the customer's and the merchant's payment instructions 2. The data message 2 is transmitted over the Internet to the merchant's financial institution server 18 where the server decrypts all but the encrypted sensitive information and reads the data message and begins settlement procedures with the customer's financial institution 16 over the automated clearing house (ACH) network or electronic check processing (ECP) network using an ACH or ECP (hereafter "ACH") debit request 3a. In the second preferred embodiment the debit request includes the encrypted sensitive information. The debit request is received by the CFISP 14a which decrypts the sensitive information and transmits the completely decrypted ACH or ECP debit request 3c to the customer's financial institution 16.

Figure 4:
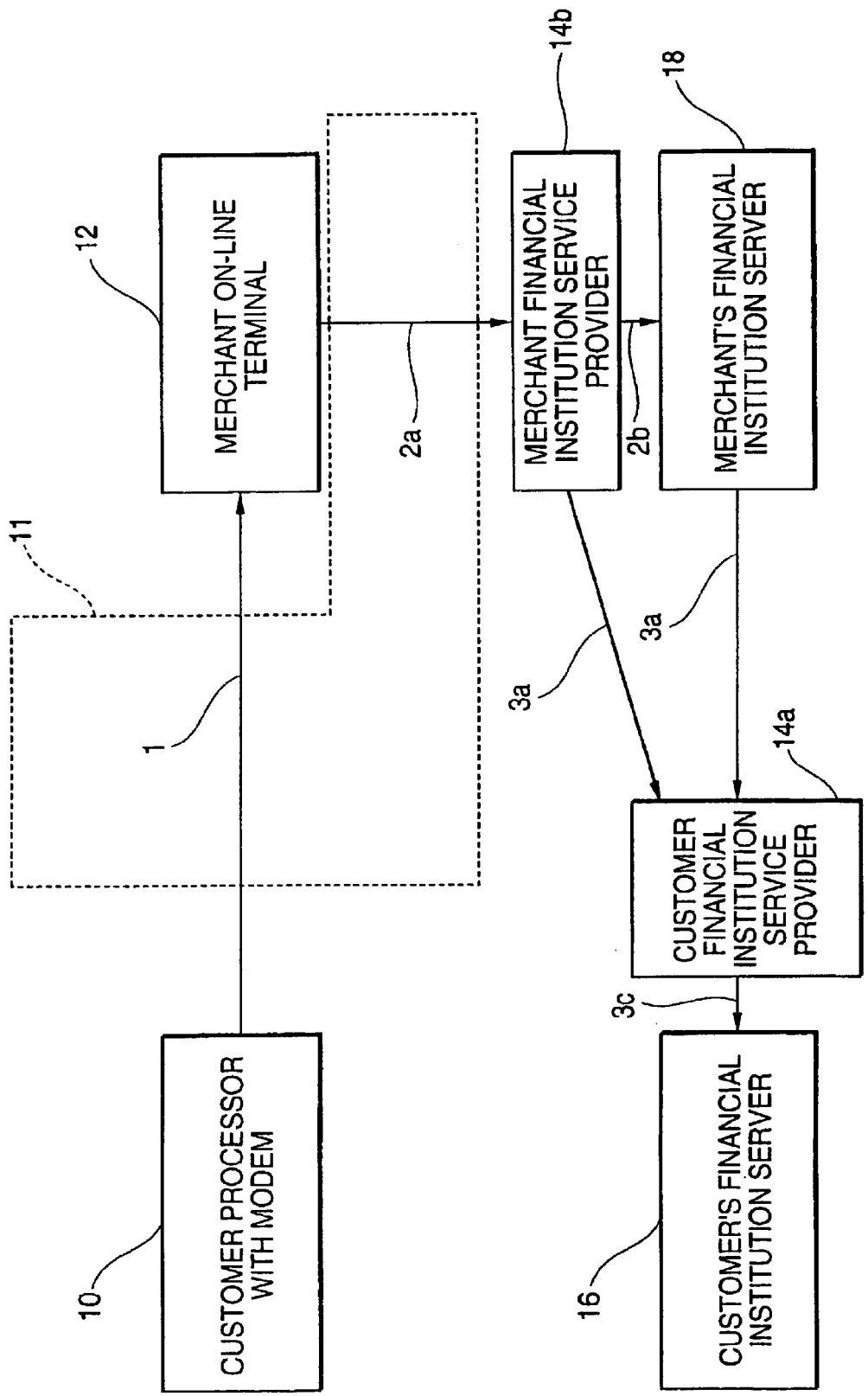
FIG. 4 is a third payment system embodiment.

The third preferred embodiment of the present invention combines the capabilities of the first and second preferred embodiments. FIG. 4 enables a customer modem 10 to transmit customer payment instructions 1 via the Internet 11 to a merchant terminal 12. The merchant terminal 12 adds the merchant's payment instructions and transmits the data message containing both the customer and merchant payment instructions 2a (hereafter "data message") over the Internet 11 to the MFISP server 14b. The MFISP 14b receives the data message 2a and reformats it into a deposit message 2b that is recognizable and readable by the merchant's financial institution 18. This reformatting is necessary since the original data message 2a received by the MFISP is in an Internet or other public access network format, unreadable by the merchant's financial institution 18. The MFISP transmits the deposit message over a closed communication channel (CCC) or similar network that is established as a network for carrying deposit messages to financial institutions.

The merchant's financial institution server 18 decrypts all but the encrypted sensitive information and reads the data message and begins settlement procedures with the customer's financial institution 16 over the automated clearing house (ACH) network or electronic check processing (ECP) network using an ACH or ECP (hereafter "ACH") debit request 3a. The debit request includes the encrypted sensitive information. The debit request is received by the CFISP 14a which decrypts the sensitive information and transmits the completely decrypted ACH or ECP debit request 3c to the customer's financial institution 16. In an alternative embodiment, the MFISP 14b performs the composition of the ACH or ECP debit request and transmits it to the customer's financial institution 16. As is shown, the CFISP 14a intercepts the ACH or ECP debit request in order to decrypt the encrypted sensitive information.

In describing a fourth preferred embodiment of the present invention, the following hypothetical situation illustrates the need for such a system and method. A customer, not limited to either an individual or a business, has discovered the Internet to be an appropriate forum in which to locate prospective merchandise and/or services and merchants for the customer's purchasing needs. Instead of being limited to either using credit card information via e-mail; Hypertext Markup Language (HTML) pages; or telephonically with all of the debit and credit delays associated therewith; or even more cumbersome, having to actually go to the merchant's location and make the purchase in person, the customer desires to access the customer's accounts with the customer's financial institution on-line and in real-time to satisfy payment to the merchant.

The customer's financial institution, utilizing the method and system of a fourth preferred embodiment of the present invention, is capable of offering this service to the customer through a CFISP without the need for installation of equipment or software at the customer's financial institution and without the need to reveal to the customer, the use of the service provider. In fact, in practice, the presence of the service provider is unknown to either the customer or the merchant. The customer and the merchant both believe that the customer's financial institution is performing all of the steps in the transaction. Consequently, the customer's financial institution increases its marketability with the ability to offer demanded Internet payment services without incurring the costs associated with implementing institution-wide hardware and software.

Figure 5:
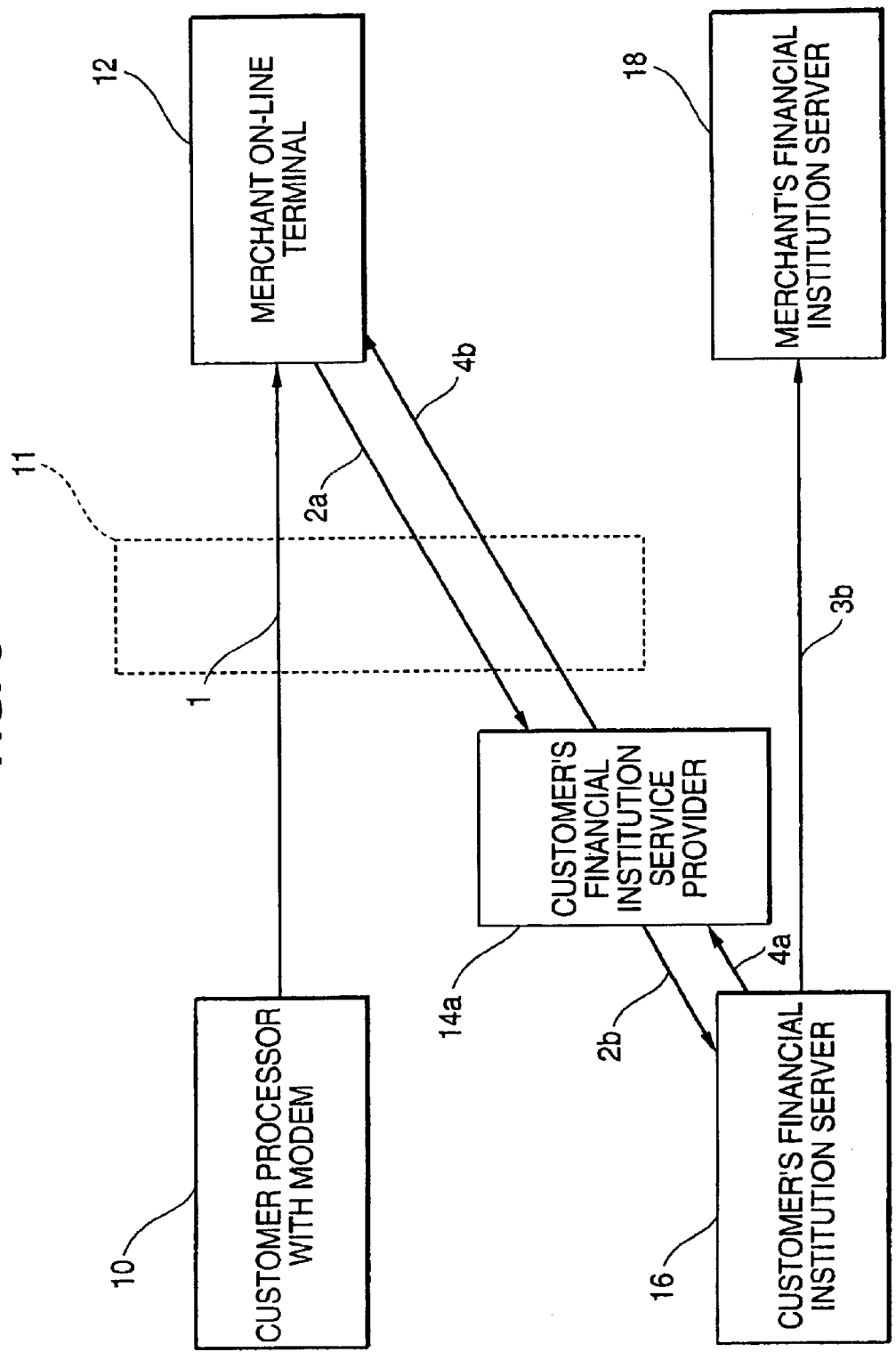
FIG. 5 is a fourth payment system embodiment.

The fourth preferred embodiment is illustrated in FIG. 5, wherein, the customer modem 10 sends customer payment instructions 1 over the Internet 11 to a merchant's Internet terminal 12. The merchant's terminal 12 attaches the merchant's payment instructions and forms a data message having both the customer's and the merchant's payment instructions 2a. The data message 2a is transmitted over the Internet to the customer's financial institution server 16 but is first intercepted by the CFISP 14a where it is reformatted into a recognizable and readable on-line debit message (e.g., ATM) 2b and then forwarded on to the customer's financial institution server 16 over a CCC. This reformatting is necessary since the original data message 2a received by the CFISP is in an Internet or other public access network format, unreadable by the customer's financial institution 16. The customer's financial institution 16 checks the customer's chosen payment account to verify that the funds are available and sends an on-line, real-time notification 4a to the merchant 12 over the CCC. The CFISP 14a receives the notification authorizing or denying the debit over the CCC and reformats the notification 4b for transmittal over the Internet 11 to the merchant terminal 12. The customer's financial institution or the CFISP, either simultaneous with the notification message or at some later time, will send a guaranteed ACH credit 3b to the merchant's financial institution server 18 in order to facilitate settlement of the transaction. In the case where the CFISP sends the ACH credit, the CFISP is necessarily a financial institution as opposed to being strictly a service provider.

In a fifth preferred embodiment of the present invention, similar to the second preferred embodiment of the present invention, the merchant's financial institution does not choose to have the merchant's account number, or other sensitive information necessary for carrying out the payment transaction, presented to the customer or anyone other participant, other the merchant's own financial institution, in any readable form. But, in the fifth preferred embodiment, the merchant's financial institution does not have the necessary decryption tools for reading the encrypted, sensitive information.

Figure 6:
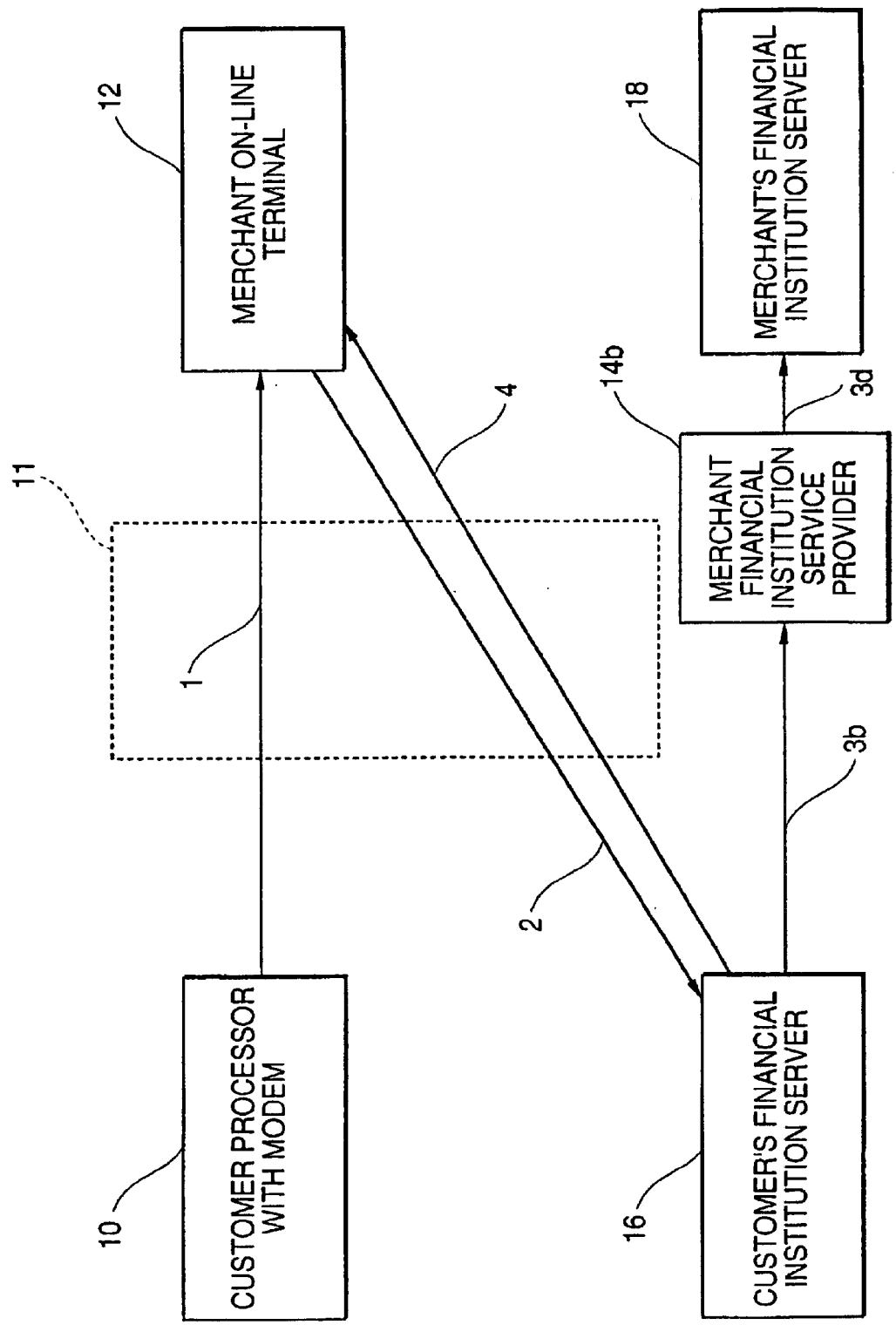
FIG. 6 is a fifth payment system embodiment.

In FIG. 6, utilizing a processor with a modem 10, the customer sends encrypted customer payment instructions 1 over the Internet 11 to a merchant's Internet terminal 12. The merchant's terminal 12 attaches the merchant's payment instructions and forms a data message having both the customer's and the merchant's payment instructions 2. The data message 2 is transmitted over the Internet 11 to the customer's financial institution server 16 where the server sends a notification 4 of authorization or denial of debit from the customer's selected payment account to the merchant over the Internet 11. The customer's financial institution 16 also decrypts all but the merchant's encrypted sensitive information and reads the data message and begins settlement procedures with the merchant's financial institution 18 by issuing an ACH credit 3b. In the fifth preferred embodiment the ACH credit includes the encrypted sensitive information. The ACH credit is received by the MFISP 14b which decrypts the sensitive information and transmits the completely decrypted ACH credit 3d to the merchant's financial institution 18.

A sixth preferred embodiment of the present invention combines the fourth and fifth preferred embodiments of the present invention, wherein each financial institution utilizes a service provider.

Figure 7:
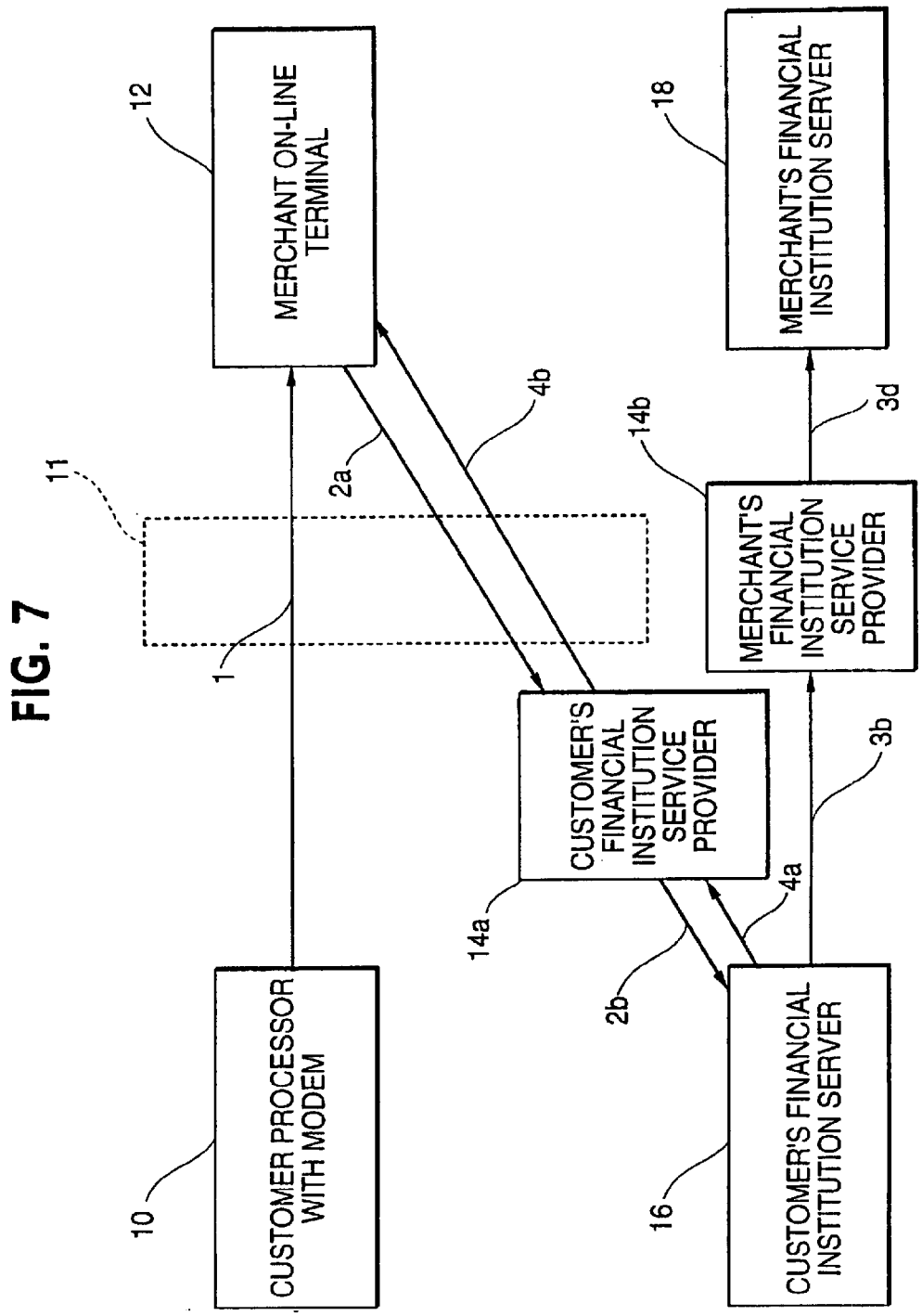
FIG. 7 is a sixth payment system embodiment.

In FIG. 7, the customer modem 10 sends customer payment instructions 1 over the Internet 11 to a merchant's Internet terminal 12. The merchant's terminal 12 attaches the merchant's payment instructions and forms a data message having both the customer's and the merchant's payment instructions 2a. Specific portions of the merchant's payment instructions are encrypted so as not to be readable by any party other than the merchant's financial institution. The data message 2a is transmitted over the Internet to the customer's financial institution server 16 but is first intercepted by the CFISP 14a where it is reformatted into a recognizable and readable on-line debit message (e.g., ATM) 2b and then forwarded on to the customer's financial institution server 16 over a CCC. This reformatting is necessary since the original data message 2a received by the CFISP is in an Internet or other public access network format, unreadable by the customer's financial institution 16. The customer's financial institution 16 checks the customer's chosen payment account to verify that the funds are available and sends an on-line, real-time notification 4a to the merchant 12 over the CCC. The CFISP 14a receives the notification authorizing or denying the debit over the CCC and reformats the notification 4b for transmittal over the Internet 11 to the merchant terminal 12.

Simultaneously, or soon thereafter, the customer's financial institution or the CFISP, decrypts all but the merchant's encrypted sensitive information and reads the data message and begins settlement procedures with the merchant's financial institution 18 by issuing an ACH credit 3b. In the sixth preferred embodiment the ACH credit includes the encrypted sensitive information. The ACH credit is received by the MFISP 14b which decrypts the sensitive information and transmits the completely decrypted ACH credit 3d to the merchant's financial institution 18.

A seventh preferred embodiment of the present invention addresses the online payment situation wherein the customer seeks to minimize the amount of customer payment and identification information that is available to any entity other than the customer's financial institution. In this particular embodiment, the customer's bank is not capable, without a service provider, of receiving and understanding the customer's Internet payment request.

Figure 8:
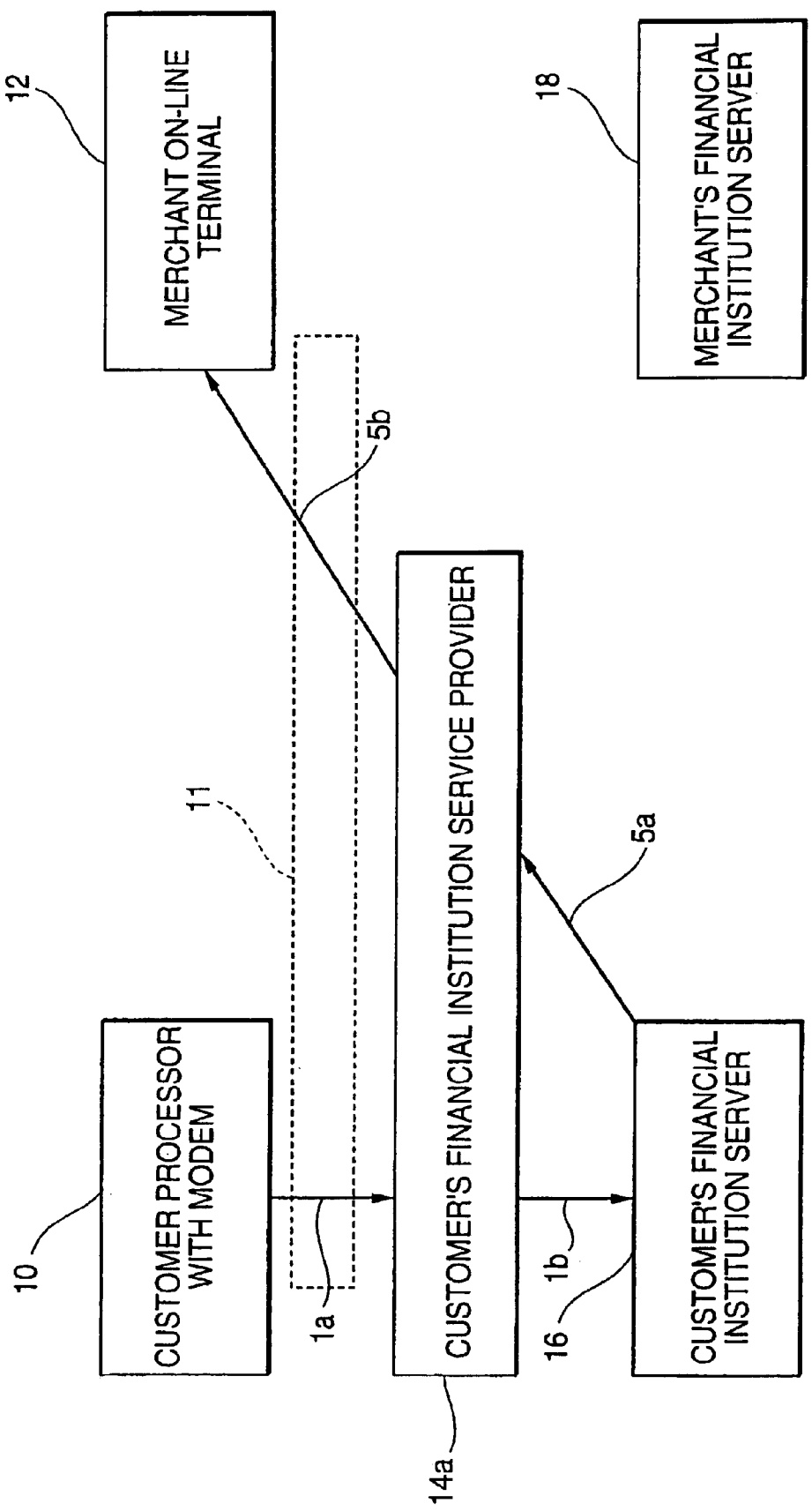
FIG. 8 is a seventh payment system embodiment.

Referring to FIG. 8, the customer modem 10 directs the customer payment instructions 1a to the customer's financial institution 16 via the Internet 11. The CFISP 14a then reformats the customer payment instructions into a CCC debit message 1b that is readable by the customer's financial institution 16 and transmits the CCC debit message over a CCC. The customer's financial institution receives the CCC debit message and either authorizes or denies the debit. Notification of this authorization (or denial as the case may be) plus the remaining or encrypted customer payment instructions 5a (hereafter "notification+") is sent via the CCC to the merchant terminal 12 but is actually first received by the CFISP 14a where the notification+ 5a is reformatted into an Internet format notification+ message 5b. The CFISP 14a then transmits Internet notification+ message 5b to the merchant terminal 12 via the Internet 11.

An alternative sub-part to the seventh embodiment, has the CFISP 14a sending the encrypted customer payment instructions 1a directly to the merchant terminal 12 either with notification of authorization 5b or without, depending on the relationship established between the CFISP 14a and the customer's financial institution.

The eighth through thirteenth embodiments of the present invention, include the system components and steps recited with reference to the seventh preferred embodiment. Consequently, these will not be repeated in the description of these additional embodiments.

Figure 9:
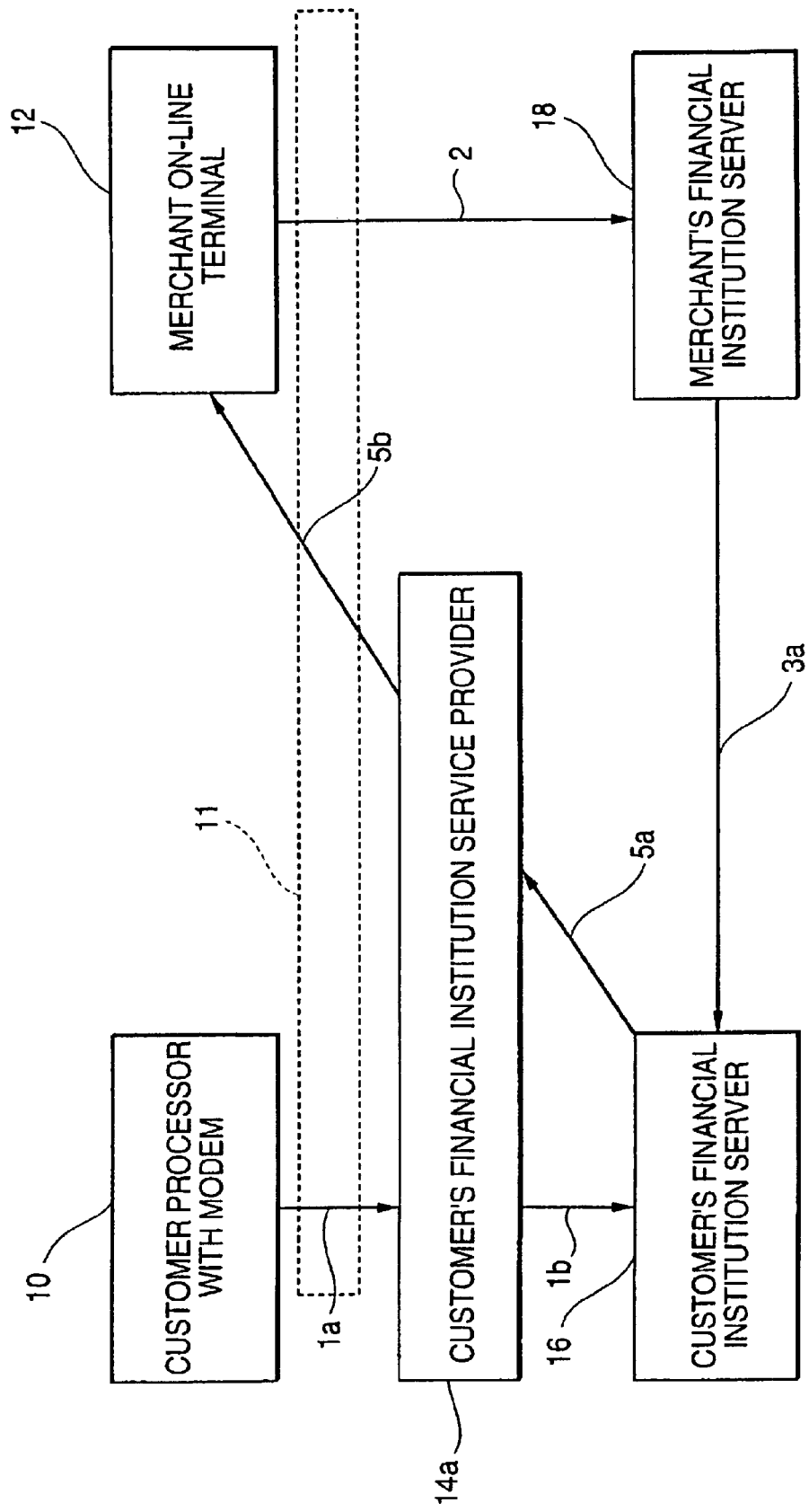
FIG. 9 is an eighth payment system embodiment.

In the eighth preferred embodiment of FIG. 9, upon receipt of the Internet notification+ message 5b, the merchant's terminal 12 attaches the merchant's payment instructions and forms a data message having both the customer's payment instructions (if any) and the merchant's payment instructions 2. The data message 2 is transmitted over the Internet to the merchant's financial institution server 18 where the server reads the data message and begins settlement procedures with the customer's financial institution 16 by issuing an ACH or ECP debit request 3a.

The customer's financial institution retrieves the customer's payment instructions or decrypts the customers portion of the payment instructions included in the ACH or ECP debit request from the merchant's financial institution in order to finalize settlement.

Figure 10:
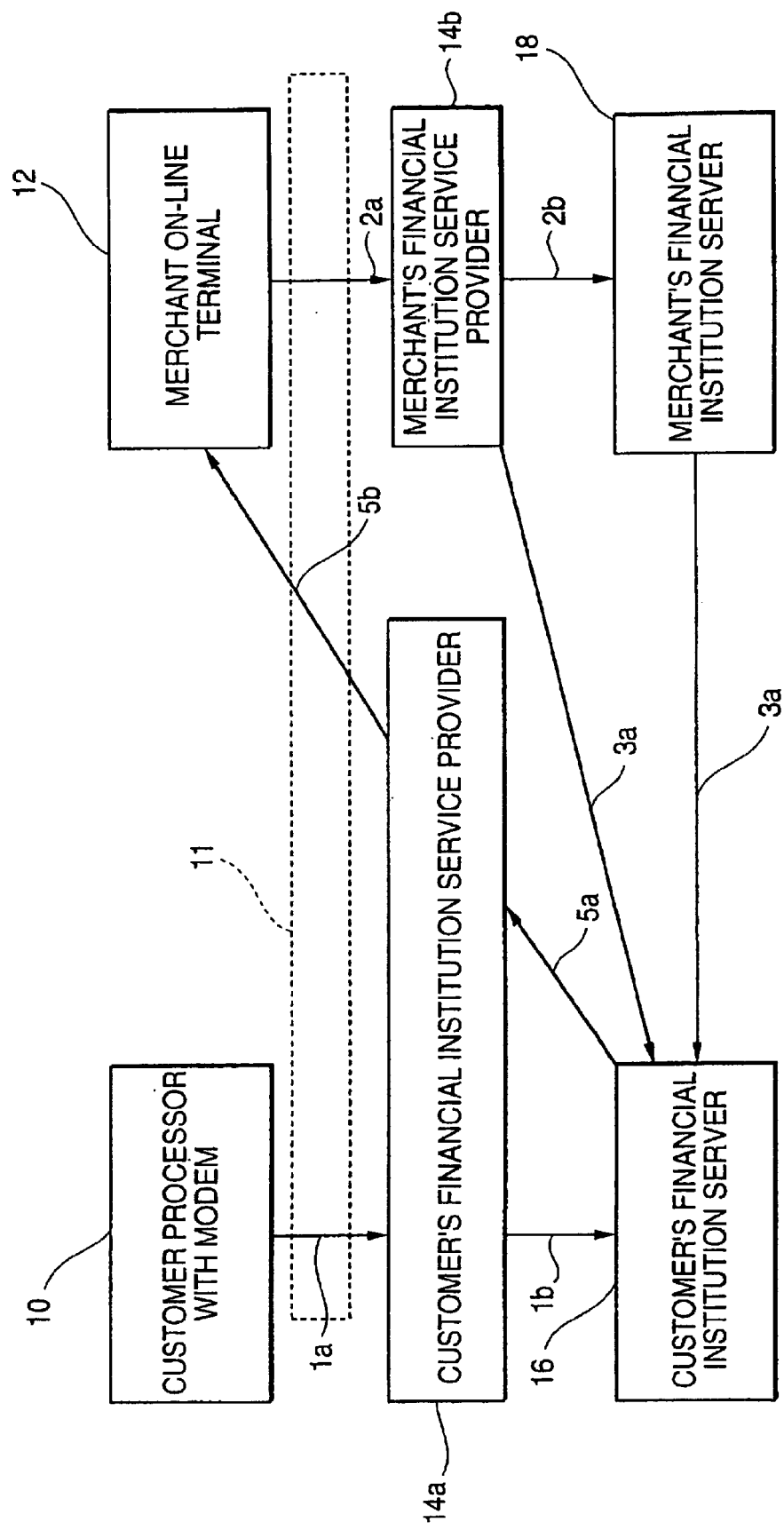
FIG. 10 is a ninth payment system embodiment.

In the ninth preferred embodiment of FIG. 10, upon receipt of the notification+ 5b the merchant terminal 12 adds the merchants payment instructions and transmits the data message containing-both the customer and merchant payment instructions 2a over the Internet 11 to the MFISP server 14b. The MFISP 14b receives the data message 2a and reformats it into a deposit message 2b that is recognizable and readable by the merchant's financial institution 18. This reformatting is necessary since the original data message 2a received by the MFISP is in an Internet or other public access network format, unreadable by the merchant's financial institution 18. The MFISP transmits the deposit message over a closed communication channel (CCC) or similar network which is established as a network for carrying deposit messages to financial institutions. The MFISP may batch two or more payment instructions in one deposit message.

The merchant's financial institution 18 receives and processes the deposit message 2b and initiates settlement with the customer's financial institution server 16 over the traditional ACH or ECP network or similar settlement channel with an ACH or ECP debit request 3a. Alternatively, the MFISP is capable of initiating the ACH or ECP debit request 3a as opposed to the merchant's financial institution.

The customer's financial institution retrieves the customer's payment instructions or decrypts the customers portion of the payment instructions included in the ACH or ECP debit request from the merchant's financial institution in order to finalize settlement.

Figure 11:
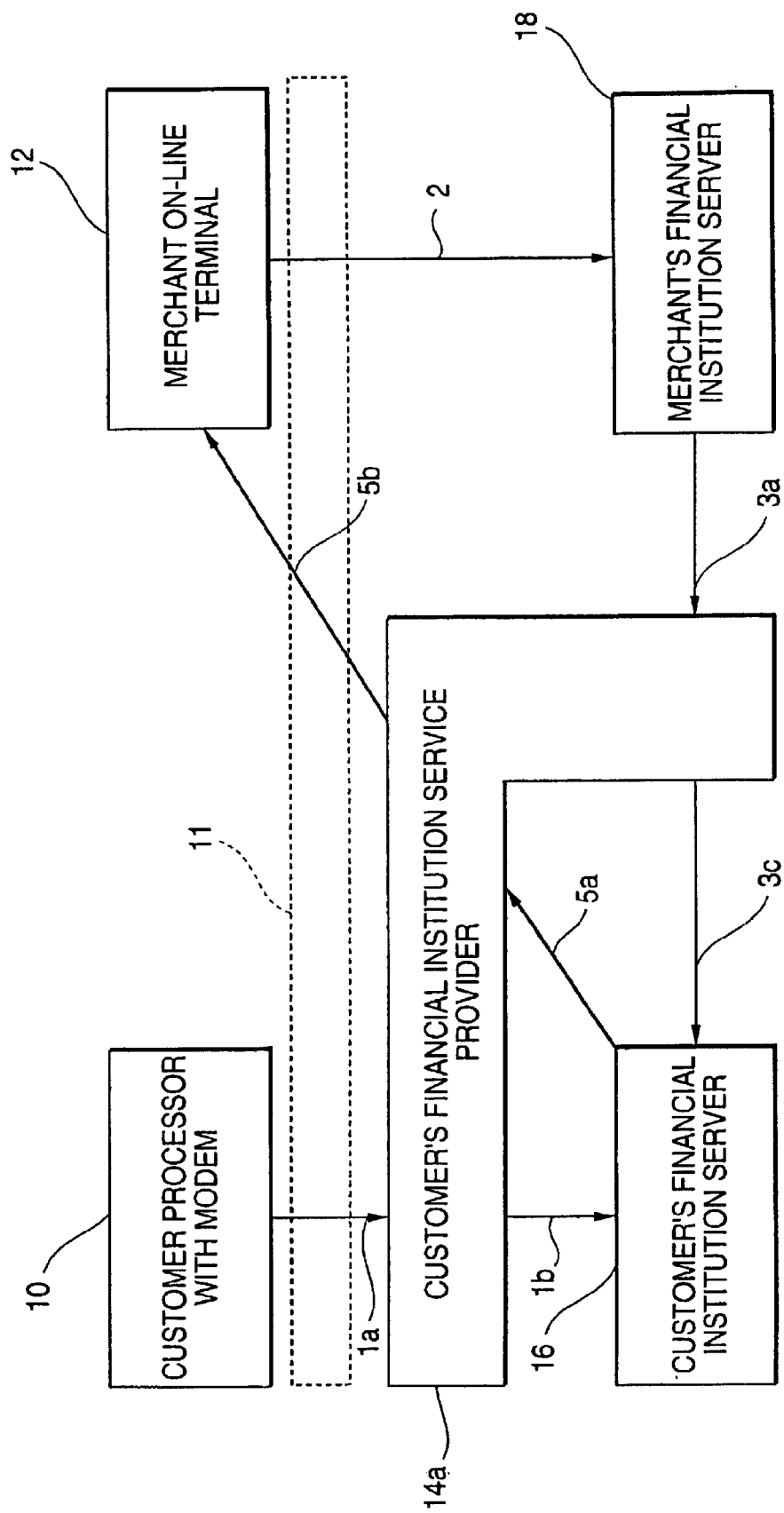
FIG. 11 is a tenth payment system embodiment.

In the tenth preferred embodiment of FIG. 11, the customer's financial institution 16 does not have the decryption capabilities necessary to decrypt the encrypted customer payment instructions within the ACH or ECP debit request 3a sent by the merchant's financial institution 18. Consequently, the ACH or ECP debit request 3a is received by the CFISP 14a and the encrypted customer payment instructions are decrypted by the CFISP 14a forming a completely readable ACH or ECP debit request 3c prior to being forwarded to the customer's financial institution 16.

Figure 12:
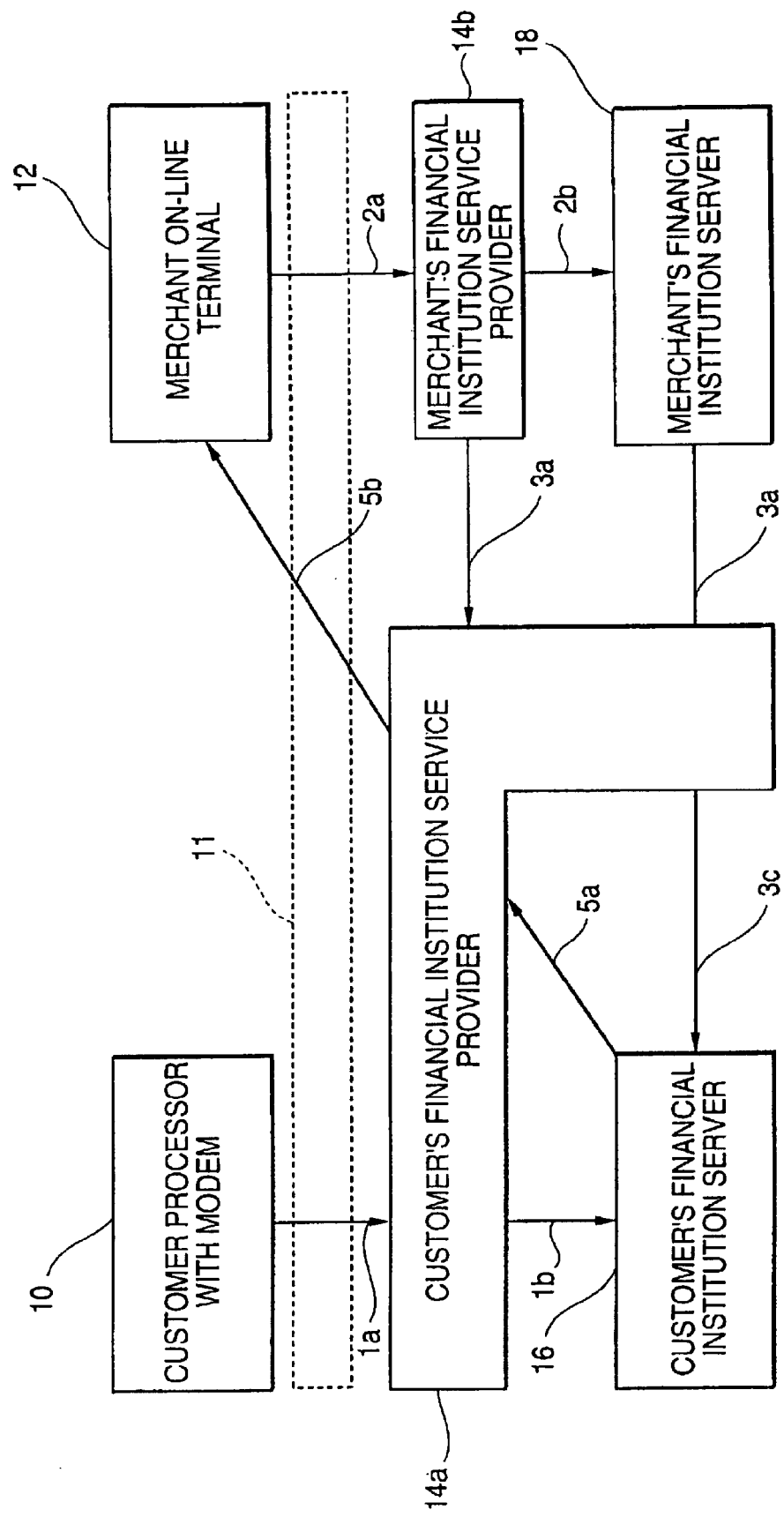
FIG. 12 is an eleventh payment system embodiment.

In the eleventh preferred embodiment of FIG. 12, the components and functions of the ninth and tenth embodiments are combined. Upon receipt of the notification+ 5b the merchant terminal 12 adds the merchant's payment instructions and transmits the data message containing both the customer and merchant payment instructions 2a over the Internet 11 to the MFISP server 14b. The MFISP 14b receives the data message 2a and reformats it into a deposit message 2b that is recognizable and readable by the merchant's financial institution 18. This reformatting is necessary since the original data message 2a received by the MFISP is in an Internet or other public access network format, unreadable by the merchant's financial institution 18. The MFISP transmits the deposit message over a closed communication channel (CCC) or similar network which is established as a network for carrying deposit messages to financial institutions.

The merchant's financial institution 18 receives and processes the deposit message 2b and initiates settlement with the customer's financial institution server 16 over the traditional ACH or ECP network or similar settlement channel with an ACH or ECP debit request 3a. Alternatively, the MFISP is capable of initiating the ACH or ECP debit request 3a as opposed to the merchant's financial institution.

Since the customer's financial institution 16 does not have the decryption capabilities necessary to decrypt the encrypted customer payment instructions within the ACH or ECP debit request 3a sent by the merchant's financial institution 18. The ACH or ECP debit request 3a is received by the CFISP 14a and the encrypted customer payment instructions are decrypted by the CFISP 14a forming a completely readable ACH or ECP debit request 3c prior to being forwarded to the customer's financial institution 16.

Figure 13:
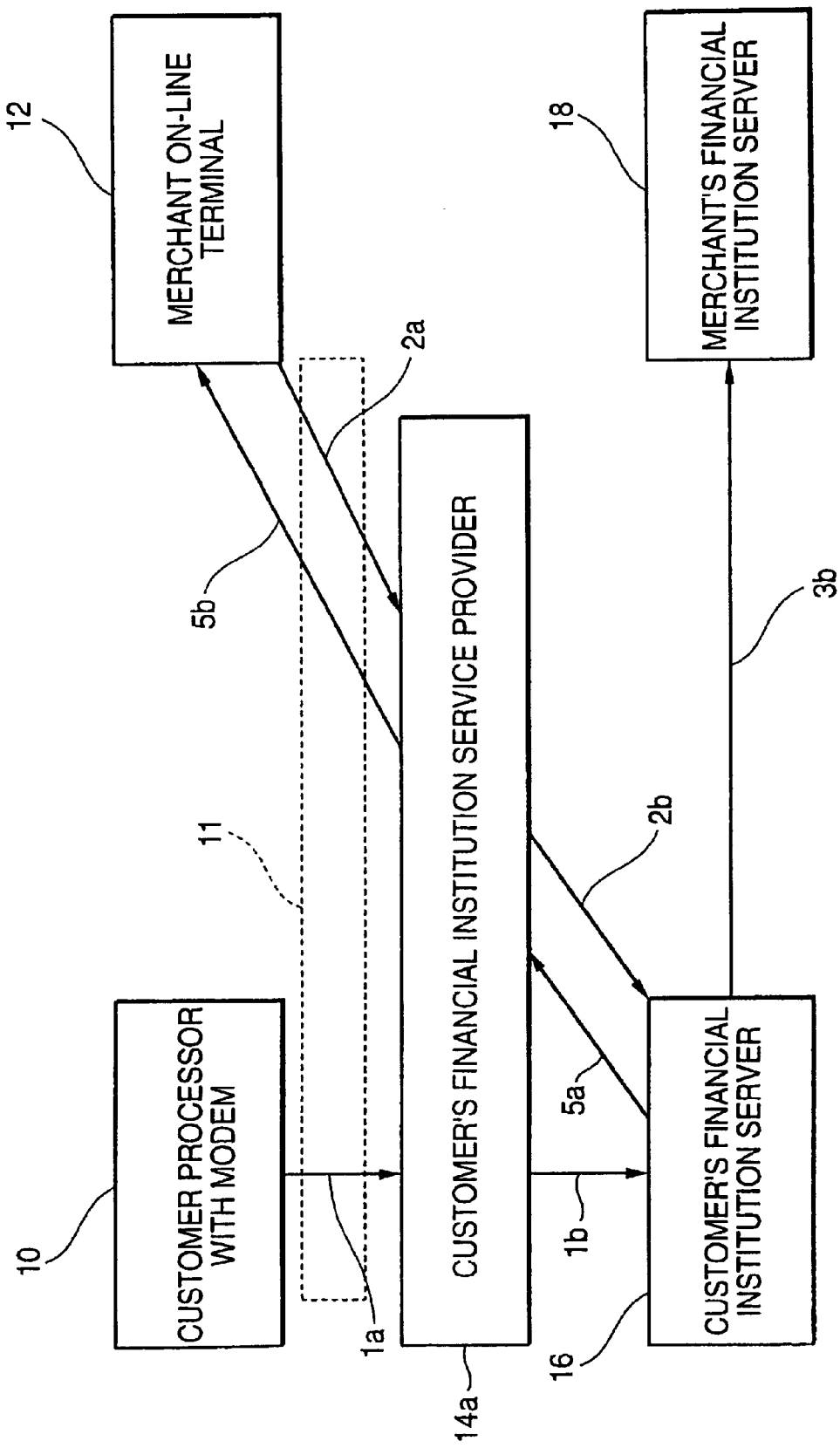
FIG. 13 is a twelfth payment system embodiment.

In the twelfth embodiment of FIG. 13, upon receipt of the notification+ 5b the merchant's terminal 12 attaches the merchant's payment instructions and forms a data message having both the customer's and the merchant's payment instructions 2a. The data message 2a is transmitted over the Internet to the customer's financial institution server 16 but is first intercepted by the CFISP 14a where it is reformatted into a recognizable and readable on-line debit message (e.g., ATM) 2b and then forwarded on to the customer's financial institution server 16 over a CCC. This reformatting is necessary since the original data message 2a received by the CFISP is in an Internet or other public access network format, unreadable by the customer's financial institution 16. The customer's financial institution server 16 initiates settlement by issuing an ACH credit 3b to the merchant's financial institution server 18.

Figure 14:
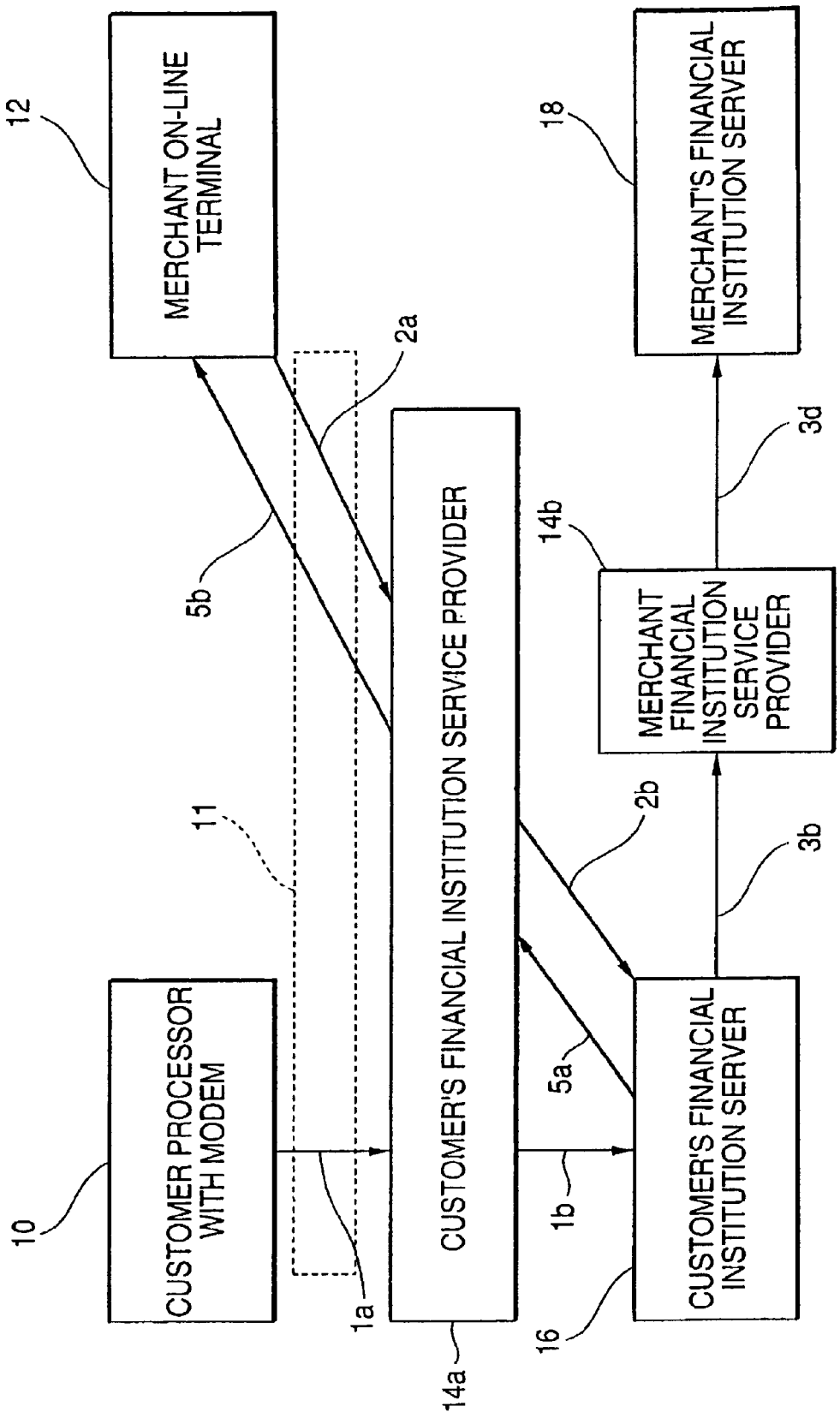
FIG. 14 is a thirteenth payment system embodiment.

In the thirteenth embodiment of FIG. 14, the components and functions of the twelfth embodiment are incorporated therein, with the addition component of a MFISP 14b. The ACH credit 3b issued by the customer's financial institution 16 is actually received by the MFISP 14b wherein encrypted merchant payment instructions are decrypted prior and a completed ACH credit 3d is the transmitted to the merchant's financial institution 18.

In all of the preferred embodiments, standard public key/private key encryption and other security mechanisms are employed to secure the transmissions of the payment instructions. When the service providers receive incoming messages they perform a variety of security checks including validating the digital certificates to identify the sender and checking the digital signatures to ensure the integrity of the messages. The service providers then decrypt the received messages to retrieve information and re-encrypt them, when appropriate, prior to transmission to their respective financial institutions.

As discussed previously, one possible source of the security mechanisms (e.g. keys, certificates, signature capability) and enabling software used in practicing the embodiments of the invention is the service providers. The service providers, in addition to issuing the security mechanisms and the software, also provide maintenance and update service with respect to these components of the system. In order to provide a maximum level of encryption security, there may be periodic changes of the keys used in the public/private key system. Similarly, there may be software upgrades and customer or merchant information changes (e.g., new accounts, name changes, address changes). Much of this responsibility stems from the contractual relationship established between the financial institution and the financial institution's service provider. Along these same lines, in addition to the security, software, formatting, and routing services performed by the service provider, the service providers also offer transaction tracking services, investigatory services, and Internet server operation services.

In each of the preferred embodiments discussed above, the service providers are invisible and unknown to the customer and the merchant at all times. Similarly, those employing the service providers, namely, the customer's financial institution and the merchant's financial institution do not utilize the identity of the service provider in performing their respective functions during the transaction. Consequently, although they are employing the services of the service providers, the transaction requests received by their respective servers from the service providers are indistinguishable from any other transaction requests received without the aid of a service provider.

With reference to each of the preferred embodiments, there is no limitation on the type of customer debit accounts or merchant deposit accounts which may be accessed in practicing any of the embodiments of the invention. For example, the debit accounts could include checking, savings, money market, mutual fund, or any comparable account wherein the customer's financial institution recognizes real-time debiting procedures. Merchant deposit accounts include checking, savings, money market, mutual fund, mortgage, loan, credit card, or any comparable account wherein the merchant's financial institution recognizes crediting procedures.

A significant advantage offered by the preferred embodiments offering an on-line, real-time debit authorization notification to the merchant is that the merchant understands an authorization notification (as opposed to a denial notification) from the service provider to mean that the merchant will receive an ACH credit, within one or two business days, for the amount of the purchase. Consequently, the merchant then releases the goods and/or services immediately upon receipt of the authorization notification or informs the customer of the immediate release/rejection of the order (e.g., shipment procedures will be immediately initiated). All of this appears to the customer and the merchant to have occurred on-line and in real-time.

For the preferred embodiments where there is no on-line, real-time debit authorization notification, the merchant may choose to delay the release of the goods and/or services until a reasonable time period has elapsed and the merchant has not received notification that the debit has been returned. Of course, there are many idiosyncratic factors which play into when the release of goods takes place, such as the past course of dealings between the parties, the type of goods and/or services, the purchase price and the identity of the parties. The higher the risk and the greater the loss, the less likely there will be a release without some notification of debit authorization.

Similarly, the while the merchant's financial institution must credit the merchant's account upon notification of the transaction, this does not translate into immediate availability of funds equaling the credit to the merchant. The merchant's financial institution will consider a variety of factors and financial institution standards in determining when to make the funds available for use by the merchant, including merchant identity, past course of dealings, and amount of the credit.

Further, for the applicable preferred embodiments discussed above, the payment software, depending on the preferences of the issuee (e.g., customer, merchant, customer's financial institution, merchant's financial institution) might include or require many conceivable types of data prior to initiating the on-line payment processes. The various types of data required for completion of an online payment transaction are capable of being retrieved and/or added at many different stages in the transaction process by different parties to the transaction. Further there are multiple levels of encryption security mechanisms which may be employed to mask the information from various parties during the transaction process. One skilled in the art recognizes the many possible scenarios and variations.

The preferred embodiments of the present invention provide for on-line and in some cases real-time payment transactions over a public access network such as the Internet, without the need for hardware other than standard processors, modems, and servers. With the abolition of the need for magnetic stripe cards or smart cards in performing an on-line debit payment transactions comes the abolition of the need for appropriate card readers and a significant reduction in cost.

One skilled in the art will recognize the many additional variations and embodiments which are contemplated by the invention. For example, in alternative embodiments, the CFISP could function as the merchant's financial institution or the MFISP could function as the customer's financial institution. In these embodiments, the service providers are referred to as correspondent financial institutions since the service providers also offer banking services. Depending on the specific embodiment, the correspondent financial institution would be able to either authorize and debit the customers account upon receipt of the data message if acting in the MFISP/customer financial institution capacity or credit the merchant's selected deposit account upon receipt of debit authorization if acting in the CFISP/merchant financial institution capacity.

Another variation that is inherent to each of the preferred embodiments is anticipated multiplicity of parties. For example, the CFISP and the MFISP could handle as many Internet payment requests from as many customers as the customers' financial institution services and to whom the appropriate enabling software has been issued. Likewise, the MFISP will process as many merchant payment requests as it receives for the merchants' financial institution, limited only by the number of merchants who utilize the merchant financial institution and are in possession of the enabling software.

This multiplicity variation also applies to multiple financial institutions utilizing a single service provider, each financial institution accepting payment transactions via the service provider for multiple customers or merchants.

Finally, a single service provider could be simultaneously acting as a CFISP and a MFISP.

There are additional software inclusions that do not directly affect the actual formation process of the data messages. The issued software anticipates multiple users within, for example, a single family or business. For added security and privacy, the software is configured to accommodate multiple passwords for multiple users. Similarly, the service provider may personalize the software with multiple digital certificates for multiple users. By way of example, a husband and wife may hold multiple accounts with a customer's financial institution, some joint accounts, some individual accounts. Both may wish to utilize the Internet or comparable public access network for making purchases and both may desire to pay over the Internet with funds from accounts held at the customer's financial institution. Further, for a large payment amount, one or both of the husband and wife may desire to split the payment between multiple accounts. The service provider will issue digital certificates to both individuals which include their respective account information and will require separate passwords or personal identification numbers (PINs) prior to attaching them to a data message.

Although the invention has been described with reference to these preferred embodiments, other embodiments can achieve the same results. Variations and modifications of the present invention will be apparent to one skilled in the art and the present disclosure is intended to cover all such modifications and equivalents.

I claim:

1. A method for processing a financial transaction involving a first user, a first user's financial institution, a second user, a second user's financial institution, and a service provider over multiple networks, comprising:

issuing to the first user i) software for directing steps of the financial transaction and ii) at least one certificate for identifying the first user to the service provider, wherein at least one of i) or ii) contains information about the first user's financial institution;

receiving at the service provider from the second user via a first network at least the first user's at least one certificate, the second user's financial transaction information, and an encrypted first data message requesting performance of a financial transaction, wherein the financial transaction includes debiting an account of the first user held at the first user's financial institution;

verifying an identity of the first user at the service provider via the first user's at least one certificate;

decrypting at the service provider the first data message to facilitate performing the financial transaction;

formatting at the service provider at least a first portion of the first data message to resemble a financial transaction that is recognizable and readable by the first user's financial institution;

encrypting by the service provider the formatted portion of the first data message;

forwarding from the service provider the encrypted formatted portion of the first data message to the first user's financial institution via a second network requesting authorization to perform the financial transaction;

receiving at the service provider via the second network from the first user's financial institution a response to the request for authorization to perform the financial transaction; and transmitting from the service provider to the second user via the first network a response to the request for authorization to perform the financial transaction.

2. A method according to claim 1, wherein the formatted portion of the first data message that is recognizable and readable by the first user's financial institution is a debit message.

3. A method according to claim 2, further comprising:

initiating settlement of accounts by the first user's financial institution between the first user's financial institution and the second user's financial institution via a third data message over a third network, wherein the third data message is based on at least a portion of the debit message.

4. A method according to claim 3, wherein the third network is an automated clearing house (ACH) network.

5. A method according to claim 3, wherein the third data message is a credit.

6. A method according to claim 5, wherein the credit is an automated clearing house (ACH) credit.

7. A method according to claim 1, wherein the response to the request for authorization to perform the financial transaction is selected from the group consisting of:

(1) a denial of authorization to perform the financial transaction, (2) an authorization to perform the financial transaction, and (3) a request for further information.

8. A method according to claim 1, wherein the first notification of the response to the request for authorization to perform the financial transaction is contained in a second data message.

9. A method according to claim 1, wherein the second network is a closed communication channel.

10. A method according to claim 9, wherein the closed communication channel transmits debit requests.

11. A method according to claim 9, wherein the closed communication channel is the Internet.

12. A method according to claim 1, further comprising:

reformatting at the service provider the response to the request for authorization to perform the financial transaction prior to transmitting the response to the second user.

13. A method according to claim 1, further comprising:

initiating settlement of accounts by the service provider between the first user's financial institution and the second user's financial institution via a third data message over a third network, wherein the third data message is based on at least a second portion of the first data message.

14. A method according to claim 13, wherein the third network is an automated clearing house (ACH) network.

15. A method according to claim 13, wherein the third data message is a credit.

16. A method according to claim 15, wherein the credit is an automated clearing house (ACH) credit.

17. A method according to claim 1, wherein the first network is a public access network.

18. A method according to claim 17, wherein the public access network the Internet.

19. A method according to claim 1, wherein the first data message is electronic mail (e-mail) message.

20. A method according to claim 1, wherein the first data message is a hypertext mark-up language (HTML) page.

21. A method for processing a financial transaction involving a first user, a first user's financial institution, a second user, a second user's financial institution, and a service provider over multiple networks, comprising:

issuing to the first user i) software for directing steps of the financial transaction and ii) at least one certificate for identifying the first user to the service provider, wherein at least one of i) or ii) contains information about the first user's financial institution;

receiving at the service provider from the first user via a first network at least the first user's at least one certificate, the second user's financial transaction information, and an encrypted first data message requesting performance of a financial transaction, wherein the financial transaction includes crediting an account of the first user held at the first user's financial institution;

verifying the identity of the first user at the service provider via the first user's at least one certificate;

decrypting at the service provider the first data message to facilitate performing the financial transaction;

formatting at the service provider at least a first portion of the first data message to resemble a financial transaction that is recognizable and readable by the first user's financial institution;

encrypting by the service provider the formatted portion of the first data message; and forwarding from the service provider the encrypted formatted portion of the first data message to the first user's financial institution via a second network.

22. A method according to claim 21, wherein the formatted portion of the first data message that is recognizable and readable by the first user's financial institution is a credit message.

23. A method according to claim 21, wherein the first network is a public access network.

24. A method according to claims 23, wherein the public access network is the Internet.

25. A method according to claims 22, further comprising:

initiating settlement of accounts by the first user's financial institution between the first user's financial institution and the second user's financial institution via a third data message over a third network, wherein the third data message is based on at least a portion of the credit message.

26. A method according to claim 25, wherein the third network is an automated clearing house (ACH) network.

27. A method according to claim 25, wherein the third network is an electronic check processing (ECP) network.

28. A method according to claim 25, wherein the third data message is a debit request.

29. A method according to claim 26, wherein the debit request is an automated clearing house (ACH) debit request.

30. A method according to claim 28, wherein the debit request is an electronic check processing (ECP) debit request.

31. A method according to claim 21, wherein the first data message is electronic mail (e-mail) message.

32. A method according to claim 21, wherein the first data message is a hypertext mark-up language (HTML) page.

33. A method according to claim 21, wherein the second network is a closed communication channel.

34. A method according to claim 33, wherein the closed communication channel transmits credit messages.

35. A method according to claim 33, wherein the closed communication channel is the Internet.

36. A method according to claim 21, further comprising:

initiating settlement of accounts by the service provider between the first user's financial institution and the second user's financial institution via a third data message over a third network, wherein the third data message is based least a second portion of the first data message.

37. A method according to claim 36, wherein the third network is an automated clearing house (ACH) network.

38. A method according to claim 36, wherein the third network is an electronic check processing (ECP) network.

39. A method according to claim 36, wherein the third data message is a debit request.

40. A method according to claim 39, wherein the debit request is an automated clearing house (ACH) debit request.

41. A method according to claim 39, wherein the debit request is an electronic check processing (ECP) debit request.

\* \* \* \* \*

UNITED STATES PATENT AND TRADEMARK OFFICE
CERTIFICATE OF CORRECTION

PATENT NO. : 6,947,908 B1  
DATED : September 20, 2005  
INVENTOR(S) : Alan Slater It is certified that error appears in the above-identified patent and that said Letters Patent is hereby corrected as shown below:

Column 16,  
Line 53, change "claims 23" to -- claim 23 --.  
Line 55, change "claims 22" to -- claim 22 --.

Column 17,  
Line 1, change "claim 26" to -- claim 28 --.

Signed and Sealed this

Twentieth Day of December, 2005

JON W. DUDAS  
*Director of the United States Patent and Trademark Office*